May 3, 1949. E. F. ROSSMAN 2,469,276
SEDIMENT TRAP FOR HYDRAULIC SHOCK ABSORBERS
Filed April 17, 1947
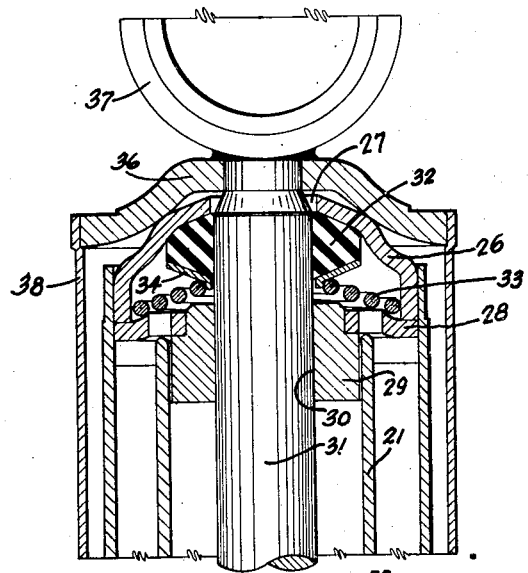
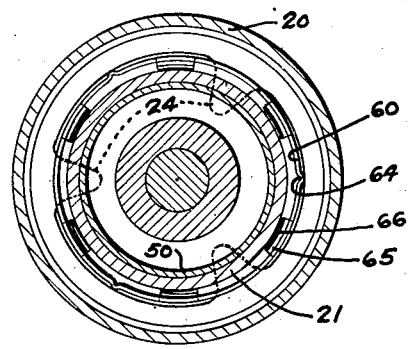
Fig. 2.
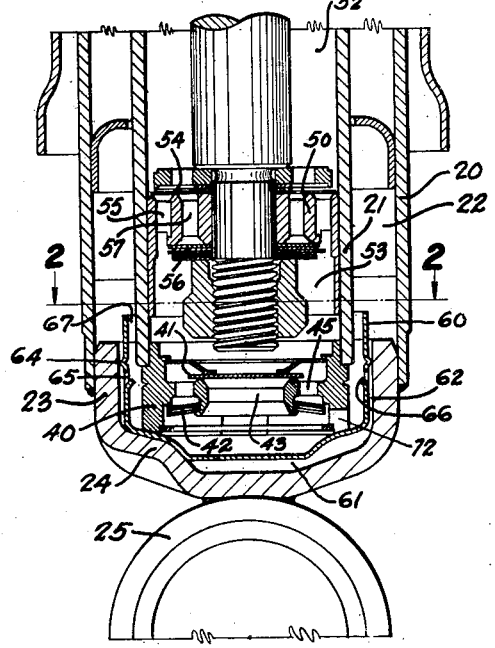
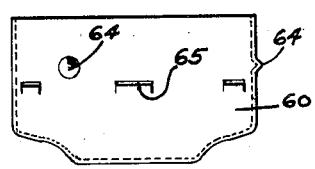
Fig. 3.
Fig. 1.
INVENTOR.
EDWIN F. ROSSMAN
BY
Spencer, Hardman and Feller
HIS ATTORNEYS.

Patented May 3, 1949

2,469,276

UNITED STATES PATENT OFFICE 2,469,276

SEDIMENT TRAP FOR HYDRAULIC SHOCK ABSORBERS

Edwin F. Rossman, Dayton, Ohio, assignor to General Motors Corporation, Detroit, Mich., a corporation of Delaware Application April 17, 1947, Serial No. 742,061

2 Claims. (Cl. 188—100)

This invention relates to improvements in hydraulic shock absorbers particularly of the direct acting type.

It is among the objects of the present invention to provide a direct acting, hydraulic shock absorber with a sediment trap or sump located at the base of the fluid reservoir and forming a region of substantially unagitated fluid where sediment or metal particles may collect and be held segregated from the fluid flowing through the valve mechanism at the bottom of the working cylinder.

Further objects and advantages of the present invention will be apparent from the following description, reference being had to the accompanying drawings wherein a preferred embodiment of the present invention is clearly shown.

In the drawings:

Fig. 1 is a longitudinal, sectional view of a direct acting, hydraulic shock absorber equipped with the present invention.

Fig. 2 is a transverse, sectional view taken along the line 2—2 of Fig. 1.

Fig. 3 is a detail view of the sump cup shown in the bottom of the fluid reservoir in Fig. 1.

Referring to the drawings, Fig. 1 illustrates in longitudinal view, a direct acting, hydraulic shock absorber adapted to be connected between the frame and axle of the vehicle for controlling the approaching and separating movements thereof. The parts of the shock absorber adapted to be connected to the axle of the vehicle comprise two concentric tubes, the outer tube being designated by the numeral 20, the inner and smaller diameter tube being designated by the numeral 21. The annular space 22 provided between these two tubes forms the fluid reservoir for the shock absorber. One end of the outer tube 20 fits about a cup-shaped closure member 23 and is secured thereto in any suitable manner, preferably by welding. Inside this cup-shaped closure member 23 are provided spaced, radial ribs 24. A mounting ring 25 is secured to the closure member 23, in any suitable manner, preferably by welding and provides means for securing this end of the shock absorber to the axle of the vehicle.

At the opposite end of the outer tube 20 there is provided a cap 26 in the form of an inverted cup telescopically received by said tube. This cup has a central opening 27. A partition plate 28 fits inside the outer tubular member 20 and abuts against the inner edge of the inverted cup member 26. This partition 28 has a central opening into which one end of a plug 29 is press fitted. This plug 29 telescopically extends into the inner tube member 21 and forms an end head. A central opening 30 in plug 29 provides a bearing in which the piston rod 31 is slidably supported. This piston rod 31 extends through the opening 27 in cup 26 to the exterior of the shock absorber. A sealing member 32 is provided in cup 26 and surrounds the piston rod 31 being urged into engagement with the rod 31 and the inner surface of cup 26 by a spiral coil spring 33 interposed between the partition 28 and abutment ring 34 engaging a surface of the sealing member 32. This sealing member 32 prevents fluid leaking past the rod 31 and its bearing 30 in plug 29 from passing to the exterior of the shock absorber through the opening 27 in cup 26.

The end of the piston rod 31 outside the shock absorber has a disc member 36 secured thereto in any suitable manner, and also a mounting ring 37 by means of which this portion of the shock absorber may be attached to the frame of the vehicle. A guard tube 38 of larger diameter than the outer tube 20 telescopically receives the disc 36 to which it is rigidly secured. This tube 38 surrounds a portion of the outer tube 20 and protects it against damage from stones and the like when applied and used upon a vehicle.

At the end of the inner tube 21 opposite the plug 29 there is provided a valve cage 40 having one end thereof fitting into the tube 21 as shown in Fig. 1. This cage 40 has valves 41 and 42, valve 41 normally closing a central aperture 43 in the cage preventing fluid from passing from the interior of the inner tube 21 to the reservoir 22 but under certain circumstances preventing fluid flow from the reservoir into the inner tube 21. Valve 42 is initially tensioned normally to close a plurality of passages 45 in the valve cage, but adapted, under certain circumstances, to establish a restricted fluid flow from within the inner tube 21 to the reservoir 22.

Secured to the inside end of the piston rod 31 is a piston assembly 50 which is reciprocated in the cylinder or inner tube 21 by the rod 31. This piston forms two fluid compression chambers 52 and 53 within the inner tube 21. Piston 50 has a plurality of fluid passages providing for the transfer of fluid between the cylindrical chambers 52 and 53. A valve 54 controls the fluid flow through piston passages 55 while a valve 56 controls the flow of fluid through piston passages 57. As the piston 50 is moved downwardly in the cylinder 21, valve 56 will maintain passages 57 closed while valve 54 will be actuated to open passages 55 and permitting transfer of fluid from the chamber 53 through the piston into the chamber 52. On the other hand, when the piston 50 is moved upwardly in the cylinder 21 valve 54 will maintain passages 55 closed and valve 56 will be actuated to establish a restricted flow of fluid through piston passages 57 for the transfer of fluid from chamber 52 to chamber 53.

Within the cup shaped closure member 23 at the bottom end of the outer tube 20 there are provided a plurality of spaced radial ribs 24. A sediment cup 60 is placed within the member 23 resting upon the radial ribs 24 in said member. This sediment cup 60 is so shaped that a space 61 is provided between the bottom inner surface of the cup 23 and the cup 60. Cup 60 is of lesser outside diameter of the cup 23 so that an annular space 62 is provided therebetween. As shown in Fig. 3 there is a detail view of the cup 60 which has a plurality of outwardly extending bumps 64, the tips of which engage the inner wall of the cup 23 and hold said sump cup 60 in position therein. Cup 60 has a plurality of openings 65 forming louvers, the lips 66 thereof extending inwardly in the cup. As shown in Fig. 1, the inside diameter of cup 60 is greater than the outside diameter of the inner tube or cylinder 21, thereby providing an annular space 67 therebetween.

In assembling shock absorbers of this type it has been found that ofttimes metal chips or other dirt or sediment is contained therein particularly if the fluid used in the shock absorber happens to be dirty. If no provisions are made, this sediment or dirt and the metal chips are circulated by the agitated fluid within the shock absorber. When the piston of the shock absorber 50 is moved upwardly in the cylinder away from the valve cage 40, fluid from the reservoir will flow through passages 72 in the valve cage which valve cage sets upon the inner surface of the sump cup 60 for clamping it into position upon the radial ribs 24 in cup 23, this fluid then passing through the central opening 43 in the cage 40 opening valve 41 and entering into the cylindrical chamber 53. Naturally any dirt or small metal particles within the oil will move with this oil fluid to the cylinder 21. As the piston 50 is moved downwardly in the cylinder 21 and exerts a pressure upon the fluid in chamber 53, this fluid will, due to its pressure upon valve 42, flow through passages 45 in the valve cage 40 past valve 42 through the openings 72 in the valve cage 40 back into the reservoir 22. Again any dirt or metal particles in the oil will be moved by this fluid agitation. By permitting the dirt and sediment, as well as smaller metal particles, to be agitated with the fluid the danger of damage to the shock absorber cylinder is present and also the possibility of fluid particles being caught under a valve to hold it open when for the efficient operation of the shock absorber said valve should be entirely closed.

To substantially eliminate these undesirable conditions which exist in the shock absorber, applicant has provided the sump cup 60 so that after agitation of the fluid and while it is at rest sediment or smaller metal particles in settling, may pass through the annular spaces 67 or 62 to the settling space 61 between the sump cup 60 and the closure cup 23 where the fluid is substantially unagitated, and where the sediment and metal particles are collected and held segregated from the agitated fluid. The settlings dropping through the annular space 67, when striking the inwardly extending lips 66 of the louvers, will be deflected to the annular space 62 where they may settle into the collection chamber 61.

From the foregoing it may be seen that applicant has provided a simple and inexpensive means within the shock absorber adapted to divert and segregate dirt and metal particles in the fluid of the shock absorber thereby freeing said fluid from these damaging elements and eliminating the possibility of having valves held open which normally should be closed.

While the embodiment of the present invention as hereindisclosed, constitutes a preferred form, it is to be understood that other forms might be adopted, all coming within the scope of the claims which follow.

What is claimed is as follows:

1. In a hydraulic shock absorber having a working cylinder and a fluid containing reservoir in communication with the working cylinder, the combination with means for displacing fluid between the reservoir and cylinder; of a cup member in the reservoir, said cup member cooperating with a wall of the reservoir to form a sump chamber in communication with the reservoir but isolated from the flow of the fluid between the reservoir and cylinder, for collecting and segregating sediment and foreign particles in the fluid.

2. A device in accordance with claim 1, in which the cup member has projecting portions holding the cup spaced from the reservoir wall, and openings provided with inwardly projecting lip portions against which sediment or foreign particles impinge so as to be deflected and directed through the openings into the segregating sump provided between the cup and the reservoir wall.

EDWIN F. ROSSMAN.

REFERENCES CITED

The following references are of record in the file of this patent:

UNITED STATES PATENTS

| Number | Name | Date |
|---|---|---|
| 1,812,519 | Eckhard | June 30, 1931 |